Patented Dec. 11, 1928.

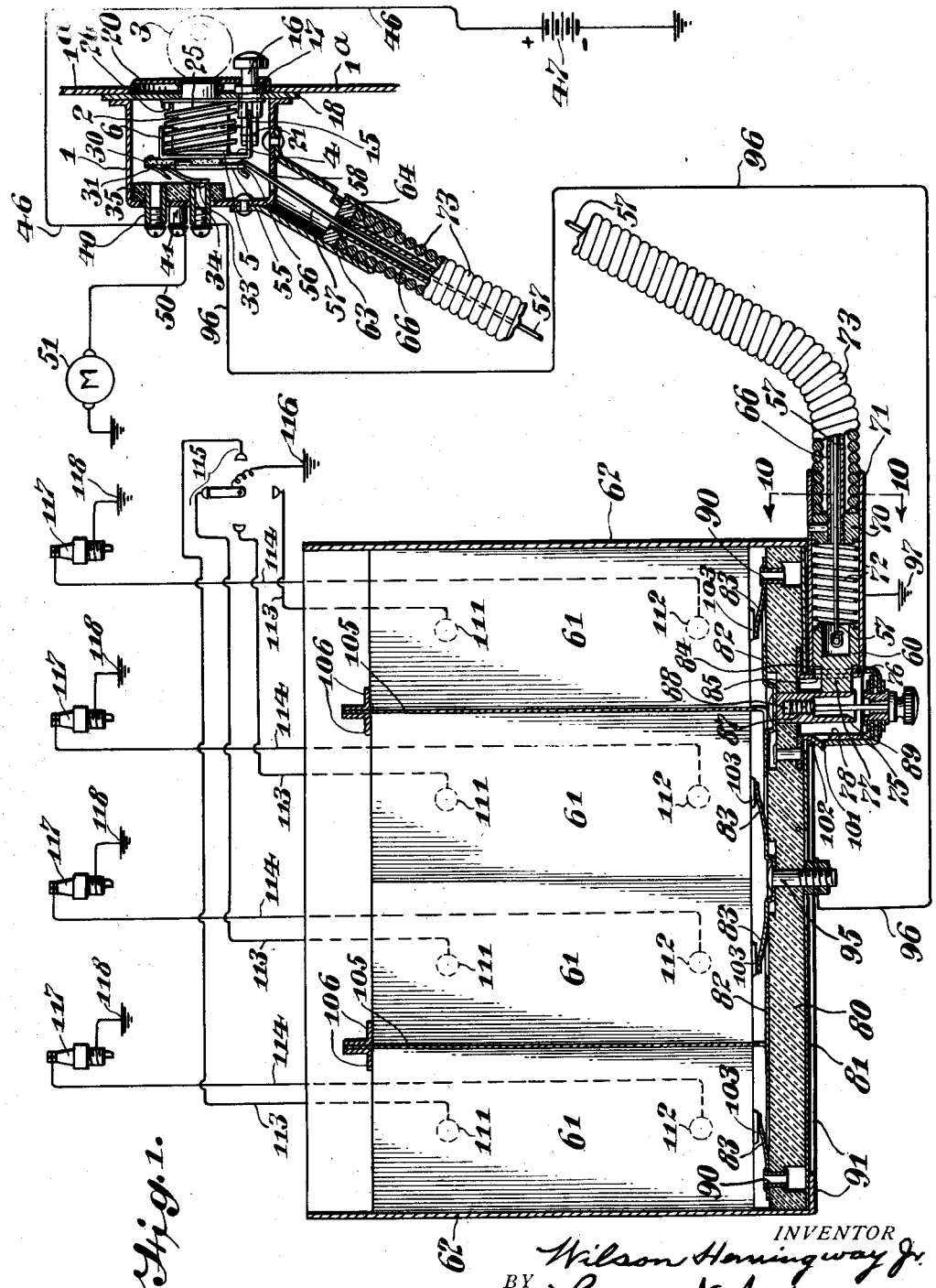

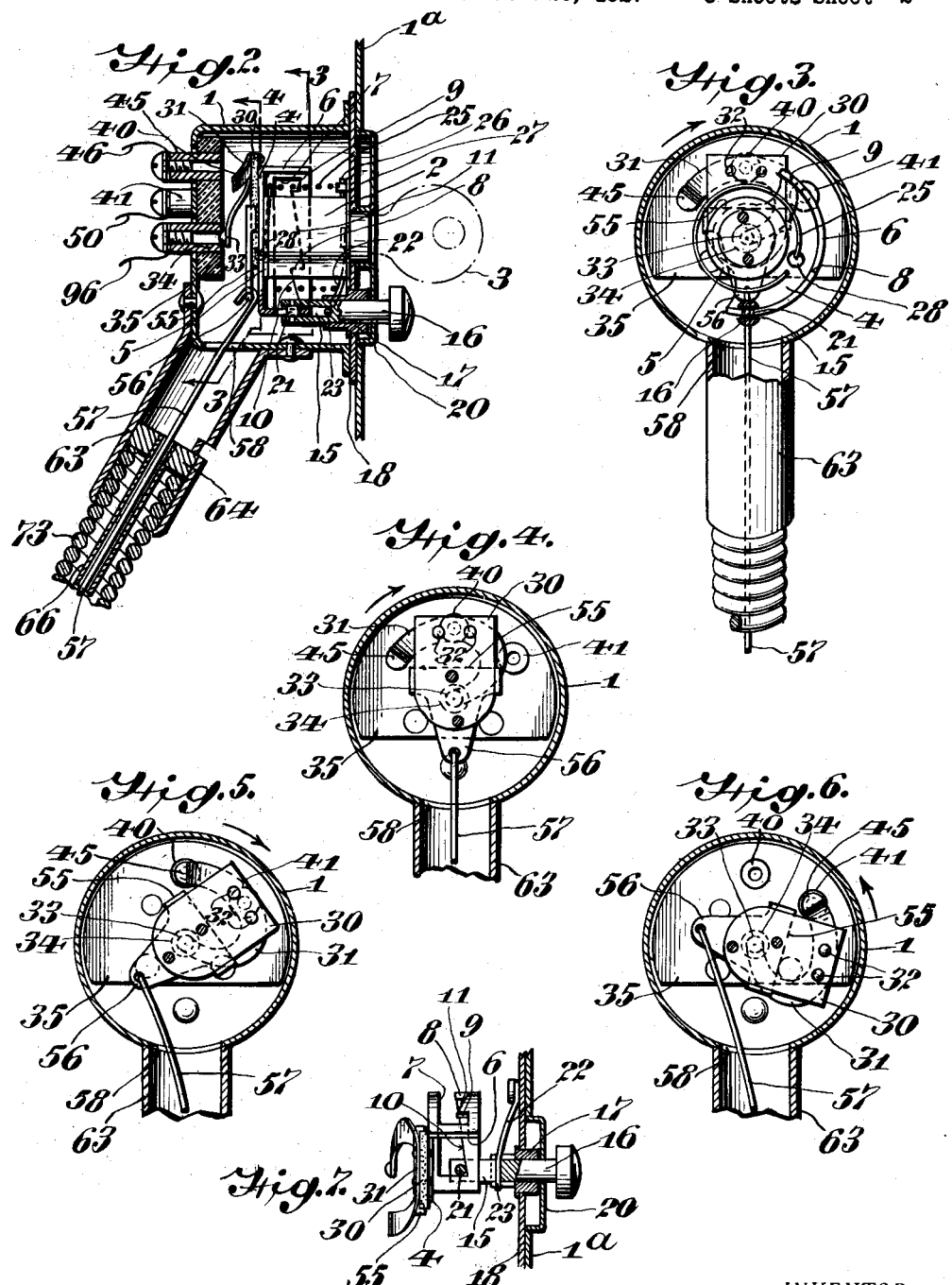

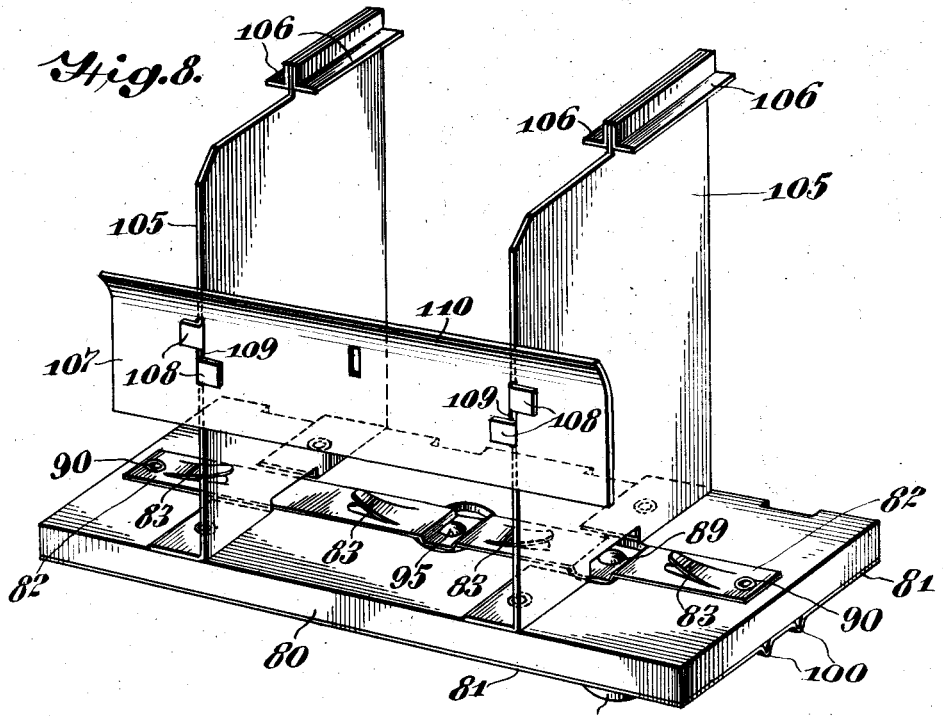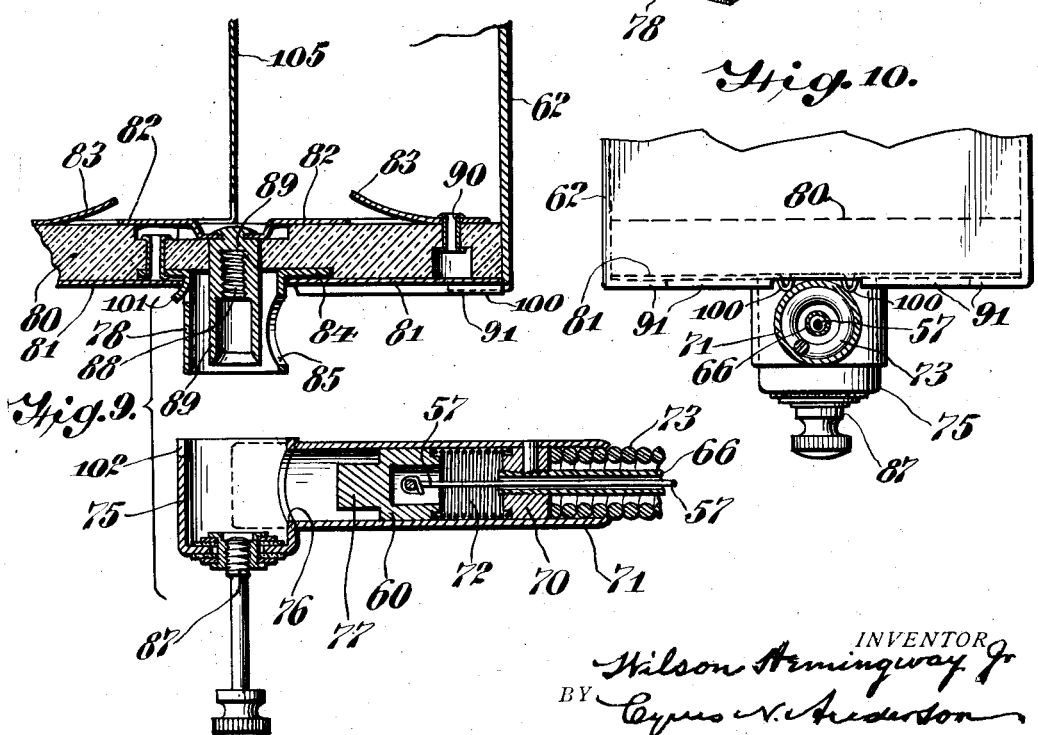

1,694,382

UNITED STATES PATENT OFFICE.

WILSON HEMINGWAY, JR., OF MELROSE PARK, PENNSYLVANIA, ASSIGNOR TO THE ELECTROLOCK MANUFACTURING COMPANY, OF VICKSBURG, MISSISSIPPI, A CORPORATION OF MISSISSIPPI.

LOCKING MEANS FOR AUTOMOBILES.

Application filed February 26, 1927. Serial No. 171,279.

My invention relates to locking means for automobiles and although it has been designed particularly for use in connection with "Ford" automobiles the principle involved in its construction may be employed in locks applied to automobiles of other makes and of other construction.

The invention has for its object generally to provide means whereby when the car is stopped the battery or the magneto, whichever may have been in use in operating the car, may not be disconnected and its operation discontinued without simultaneously with such disconnection operating a locking means whereby operation of the car except by someone having a key is prevented.

It also is an object of the invention to provide a locking device having means whereby when the lock is in locked position the coils employed as a part of the ignition system are locked against removal.

Another object of the invention is to provide a locking means of extremely simple character but of novel construction which may be manufactured and applied to cars at a minimum of expense but with high efficiency in the prevention of theft.

I shall not undertake here to point out all of the various objects and advantages incident to my invention but additional objects and advantages will be set forth in the detailed description of the invention which follows or will be apparent from such description.

In order that the invention may be readily understood and its many practical advantages fully appreciated reference may be had to the accompanying drawings in which I have illustrated one convenient form of mechanical embodiment thereof. However, it will be understood that the invention is susceptible of embodiment in other forms of construction than that shown and that various changes in the details of construction may be made within the scope of the claims without departing from the principle thereof.

In the drawings:

Fig. 1 is a view in sectional elevation of a construction embodying the invention, the locking means being shown in locked position;

Fig. 2 is a view in vertical longitudinal section of a portion of the structure including the actuating element of the locking means;

Fig. 3 is a transverse sectional view taken along the line 3—3 of Fig. 2;

Fig. 4 is a transverse sectional view taken along the line 4—3 of Fig. 2;

Fig. 5 is a view similar to that shown in Fig. 4 but with the operative parts shown therein in different position;

Fig. 6 is a view similar to that shown in Figs. 4 and 5 but with the operative parts shown therein in different positions from those in which they are shown in said figures;

Fig. 7 is a view in top plan of a fragmentary portion of the operative mechanism shown in Fig. 2, a portion of the said mechanism being shown in horizontal section;

Fig. 8 is a view in perspective of a supporting means for the coils constituting a part of the ignition system;

Fig. 9 is a view in vertical central section of the right hand end of the bottom portion of the said supporting means (having reference to Fig. 8) and a portion of the coil box within which it is located, together with locking means for locking the said supporting means in position within the said box, the elements of the locking means being shown in spaced relation to each other; and Fig. 10 is a view in transverse section taken on the line 10—10 of Fig. 1.

In the drawing I have shown a casing 1 which is adapted to be secured to the instrument board, a portion of which is indicated at 1ª, or some other part of a car structure. A lock is mounted and supported within the said casing, which lock comprises a stationary cylinder 2 within which is mounted a rotatable element of known structure rotation of which in one direction is adapted to be effected by means of a key, indicated by dotted lines at 3. A plate 4 which is generally of segmental shape is secured to the inner end of the rotatable element of the lock and is rotatable therewith. A circular washer plate 5 is located between the plate 4 and the lock structure and rotates with the said plate. The circular edge portion of the plate 4 is provided with a laterally and forwardly extending flange 6 (of arcuate shape) which has a slot 7 therein one edge of which is formed with a couple of notches providing shoulders 8 and 9. The shoulder 9 is located in adjoining relation to the right hand end of the slot 7, having reference to Fig. 2 of the drawings and looking toward the left in said figure, while the shoulder 8 is located about the middle of the said slot. The inner edge of the outer wall of the slot 7 is inclined as indicated at 10 and 11, the high points of these inclined portions terminating at the shoulders 8 and 9. The flange 6 projects into and operates within a slot 15 in the inner end of a releasing plunger 16 which projects through a bearing plug 17 mounted in the front plate 18 of the casing 1 in parallel relation to the lock. The plug 17 is shielded or protected by means of a shielding front plate 20 secured permanently, by rivets or otherwise, to the plate 18.

The inner end of the plunger 16 is provided with a crosswise extending pin 21 which extends across the slot 7. A leaf spring 22 is secured at one end to the plate 18. The opposite end thereof is provided with a laterally extending projecting portion 23 which extends into the slot 15 and presses against the bottom thereof and tends to hold the plunger outwardly or toward the front. The pin 21 is provided with an enlarged portion, as indicated in Fig. 2 of the drawings, which bears against the edge of the forward wall of the slot 7 within the circular flange 6. Rotation of the plate 4 with the flange 6 thereon toward the right (looking toward the left in Fig. 2 of the drawings) is effected by means of a key 3. Such rotation is in opposition to a coiled spring 25 one end of which is fastened to a stationary lug or projection 26 upon a relatively thin annular plate 27 secured upon the inside of the plate 18. The opposite end of the said spring 25 is provided with a hook which engages in a small opening 28 in the plate 4. The spring 25 is tensioned so that it exerts pressure tending to rotate the plate in an anti-clockwise direction when viewed from the front of the device. When in locked position the intermediate bearing portion of the pin 21 is seated against the left hand end of the slot 7, looking toward the left in Fig. 1. A sheet of insulating material 30 is mounted upon the front side of the plate 4 and supports a spring contact 31 which is curved as indicated. The contact spring 31 is secured to the insulating sheet 30 by rivets 32 at points intermediate its ends, as is clearly shown in the drawings. One end 33 of the spring is located in alinement with the axis of the rotatable element of the lock and is at all times in contact with the inner end of a binding post 34 which is mounted and supported upon a block of insulating material 35 which is secured to and supported upon the inner side of the bottom or rear end of the casing 1. The opposite end 45 of the spring contact is adapted to engage with the inner ends of the binding posts 40 and 41 which likewise are mounted and supported upon the block 35 of insulating material. These binding posts extend rearwardly through openings in the rear or bottom wall of the casing 1, which openings are of greater diameter than the binding posts so that the latter do not contact with the edges hereof.

When the rotatable element of the lock is turned in a clockwise direction by the key 3 the end 45 of the spring contact member 31 moves toward the right sliding over and in contact with the front surface of the insulating block 35, and as it travels toward the right it first contacts with the front end of the binding post 40. This occurs just as the intermediate portion of the cross pin 21 snaps into the notch and into engagement with the shoulder 8. The binding post 40 is connected by means of a conductor 46 to the positive side of a battery indicated at 47, the opposite side of which is grounded. Further clockwise rotative movement of the rotatable element of the lock causes further movement of the spring contact plate 31 to carry the end 45 thereof into engagement with the inner end of the binding post 41 which is connected by means of a conductor or connecting wire 50 with one side of a magneto indicated at 51, the opposite side of which is grounded as indicated in Fig. 1 of the drawings. As the end 45 of the curved spring contact plate 31 contacts with the inner end of the binding post 41 the intermediate portion of the cross pin 21 moves into engagement with the shoulder 9 of the slot 7 previously referred to. Engagement of the intermediate portion of the pin 21 with the shoulders 8 and 9 prevents return or anti-clockwise rotary movement of the rotatable element of the lock and the parts carried and controlled thereby until the same shall have been released by an inward movement of the plunger 16. Such inward movement may be effected by pushing the plunger 16 inwardly so as to disengage the pin 21 from the shoulders. When this occurs the spring 25 causes the plate 4 and the parts connected thereby to snap quickly back into the initial or locked position with the pin 21 in engagement with the end of the slot at the lower end of the flange 6.

A metal plate 55 is secured to the sheet 30 of insulating material and is provided with a depending tongue-like portion 56 provided with a hole adjoining the lower end thereof. The upper and outer hooked end of a wire 57 engages the said hole and extends outwardly through an opening 58 in a side of the casing 1 and is connected at its opposite end to a locking plunger 60 which is adapted to lock the holder or support for the coils 61 in position within the coil box 62. The wire 57 is of such size or diameter that it is more or less flexible.

The casing 1 is provided with a short tubular section 63 through which the portion of the wire 57 adjacent the casing extends. Mounted within the tubular section 63 is a plug 64 to which is secured the forward end of a small tube 66 through which the wire 57 extends. The opposite end of the tube 66 is connected to a plug 70 within a tubular section 71 within the opposite end of which the slidable plunger 60 is mounted. The plug 70 is permanently secured within the tubular section 71 in any desired known manner. A coiled spring 72 is located within the tubular section 71 intermediate the plunger 60 and the plug 70. The said spring 72 tends to expand and to hold the plunger 60 in projected relation to the adjoining end of the tubular section 71. As already stated, the wire 57 extends through the tube 66. The wire 57 is further protected against molestation by unauthorized persons by means of a relatively heavy coiled spring 73 made of steel or some other suitable strong metal. The forward end portion of the coil 73 projects into and is secured within the outer end of the tubular section 63 while the opposite end thereof projects into and is secured within the forward end portion of the tubular section 71. The opposite ends of the coil 73 contact with the plugs 64 and 70 previously referred to.

The rear or outer end of the tubular section 71 is provided with a transversely extending tubular head 75 which is permanently secured thereto. The inner side of the tubular head 75 is provided with an opening 76 through which the projecting reduced end portion 77 of the locking plunger 60 is adapted to project. The tubular terminal head portion 75 is adapted to be placed over a projecting tubular portion 78 secured to the bottom of the holder for the coils 61. The bottom of this holder comprises a relatively thick sheet of dielectric material 80 to the under side of which a metallic sheet 81 is secured, while to the upper side thereof a bus bar 82 is secured, said bus bar being provided with struck-up portions 83 at intervals which constitute spring contacts for cooperating with the coils 61 previously referred to. The tubular member or section 78 is provided upon its upper or inner end with a flange 84 which is located between the insulating sheet 80 and the metal sheet 81 and secured to the former as shown. The tubular member or section 78 which projects downwardly from the bottom of the holder for the coils is provided upon one side with an opening 85 which when the terminal head 75 has been placed in position as shown in Fig. 1 of the drawings is in registry with the opening 76.

For the purpose of detachably securing the tubular terminal member 75 to the similar member 78 and to the bottom of the coil holder I have provided a headed screw bolt 87 of known construction the inner end of which is adapted to engage the internal screw threads 88 in the plug 89 secured to the sheet 80 of insulating material. The plug 89 is located concentrically of the tubular member or section 78. The lower end of the plug 89 below the screw threaded portion 88 is provided with an enlarged opening, as indicated, through which the fastening screw bolt 87 extends. When the plunger 77 is in projected position as shown in Fig. 1 of the drawings it contacts with the side of the plug 89. The upper or inner end of the plug 89 is secured to and in contact with the bus bar 82 previously referred to. The latter is connected to the upper or inside surface of the insulating sheet 80 by means of rivets 90.

The central portion of the bottom of the coil box 62 is cut away so as to provide flanges, as indicated at 91, upon which the bottom of the holder rests and by means of which the holder is supported within the said box.

A binding post 95 is connected with the bus bar 82, previously referred to. The said binding post extends through the bottom of the coil holder and to its outer or lower end one end of a conductor 96 is connected the opposite end of which is connected to the binding post 34 previously referred to.

As has been stated already, the end 33 of the spring contact plate 31 is at all times in contact with the inner or front end of the binding post 34, and as has also been pointed out, the opposite end of the said contact plate is adapted to contact with the inner or front ends of the binding posts 40 and 41. These last two binding posts are so located that the spring contact contacts or engages first with the binding post 40, which is connected with the battery 47, and upon further movement contacts or engages with the inner or front end of the binding post 41, which as has been stated already is electrically connected with one side of the magneto 51.

The tubular section 71 is grounded as indicated at 97. When the plunger 60 is in contact with the plug 89 it will be apparent that the coils 61 are grounded through the bus bar 82, the plug 89, plunger 60 and tubular section 71. When the car is in operation and when the rotatable element of the lock has been turned into position to cause the cross pin 21 to engage either the shoulder 8 or the shoulder 9 of the arcuate-shaped flange 6, the plunger 60 is withdrawn into the tubular section 71 into position out of contact with the plug 89.

When the tubular section 71 is in position as shown in Fig. 1 of the drawings it lies between and in contact with ridges 100 formed by the crimping or bending of the metal sheet 81 secured to the under side of the sheet 80 of insulation. The presence of these ridges prevents rotation or turning of the tubular section 71 about the tubular projecting section 78. Cooperating with these ridges to prevent such rotation or turning is a lug or projection 101 which extends laterally from the tubular section 78 and projects through a slot 102 formed in the edge of the open end of the tubular terminal head 75.

The holder of the coils 61 is supported upon the flanges 91 of the box 62 with contacts 103 of the coils in contactual relation with the spring contacts 83 previously referred to. The holder is provided with spaced upwardly extending sheet metal portions or walls 105 which extend transversely of the holder and transversely of the coil box 62 when the holder is in place therein. The upper edges of these two metal plates 105 are provided upon opposite sides thereof with angle members 106 the bottom horizontal flanges of which extend over the adjoining end portions of the coils 51. This relationship is clearly shown in Fig. 1 of the drawings. The distance between the upright plates 105 is substantially equal to that of the combined widths of two coils. The space upon the bottom of the holder outside of the plates 105 is of a width substantially equal to the width of a coil. When the holder is placed within a coil box 62 and when the holder is locked in position by the projecting end of the plunger 60 as is shown in Fig. 1 of the drawings it is quite apparent that it cannot be removed and it also is quite apparent that the coils 61 cannot be removed because they are held against removal by the overlying horizontal flanges of the angle members 106.

A plate 107 extends transversely of the plates 105 and is secured to one edge of each of the said plates by means of the bent lugs 108 which extend through slots 109 through the said plate. The upper edge portion of the said plate 107 is bent laterally, as indicated at 110, so that when the holder is in place within the coil box 62 the edge of the laterally bent portion 110 contacts with the adjoining side of the said box and presses the holder together with the coils supported thereby toward the opposite side of the coil box so that the contacts upon the sides of the coils may be held in contact with the contacts, indicated by broken circular lines at 111 and 112, to which the ends of the conductors 113 and 114 are connected. The opposite ends of the conductors 113 have connection with a timing device, indicated generically at 115, grounded as indicated at 116, while the opposite ends of the conductors 114 are connected to the spark plugs 117 grounded as indicated at 118. The connections between the coils, the timing device and the spark plugs and the construction and operation of the two latter will not be referred to or described more in detail because these connections and these parts are of usual construction and constitute no part of the present invention.

It has been pointed out that the conductor 96 is connected at its rear end to the binding post 95 which latter is connected to the bus bar 82, and that the opposite or front end of the conductor 96 is connected to the bind-post 34 with which one end 33 of the spring contact member 31 is at all times in contact. The opposite end of the spring contact member 31 is adapted to contact either with the binding post 40 or with the binding post 41. It is apparent, therefore, that the coils 61, timing device and spark plug may be placed in circuit either with the battery 47 or with the magneto 51.

When it is desired to start a car provided with a locking means embodying my invention the operator inserts a key 3 into the lock and turns the rotatable element thereof in a clockwise direction so as to cause the end 45 of the spring contact member 31 to contact with the binding post 40. Such rotary movement of the rotatable element of the lock causes a like movement of the member 55 which is mounted upon the sheet 30 of insulating material to move in a like direction, the outer end of the tongue portion 56 thereof moving in the arc of a circle. The latter being connected with the end of the wire 57 the said wire is caused to move longitudinally to withdraw the plunger 60 to break the contact between the projecting end of the said plunger and the plug 89. When this contact is broken the connection of the coils 61 to ground at 97 is also broken. After having started the car rotation of the rotatable element of the lock may be continued so as to cause the end 45 of the spring contact member 31 to contact with the terminal post 41, the magneto as a result then being placed in circuit with the ignition system of the car operating means. When the car is stopped the circuits from the magneto and from the battery may be opened and the car locked merely by pushing the plunger 16 inwardly so as to disengage the cross pin 21 from either the shoulder 9 or the shoulder 8, as the case may be, whereupon the spring 25 operates to return the rotary element of the lock with the parts carried thereby to initial position, in which position the end 45 of the contact 31 occupies the position shown in Fig. 3, out of engagement with both of the terminal posts 40 and 41. Simultaneously the wire 57 is moved outwardly or away from the lock to cause the plunger 60 to move into the position as shown in Fig. 1 of the drawings in contact with the plug 89, whereupon electrical connection between the coils and other parts of the ignition system to the ground, as indicated at 97, is effected. The plunger 60 cannot be withdrawn except by a person having a proper key. It is apparent, therefore, that without such a key it is practically impossible for the car to be started. Because of the grounding of the coils and other parts of the ignition system at 97 current cannot be caused to flow either from the magneto or from the battery through the said coils. It is apparent that if the plunger 60 be in contact with the plug 89 any current which might be carried to the bus bar 82 through the binding post 95 would flow from the latter, not through the coils 61, but through the plug 89 and thence to the ground.

Having thus described my invention, what I claim and desire to secure by Letters Patent is:

1. Locking means for ignition mechanism, comprising, in combination, coils, a holder for said coils, a container for the said holder, locking means for protecting the said holder against removal from the said box, a switch for opening and closing the circuit of said ignition mechanism, an actuatable element for locking said switch in open position, and a connection between said locking element and said locking means whereby upon movement of said locking element into locking position the locking means is moved into locking position.

2. Locking means for ignition mechanism, comprising, in combination, a key actuatable rotatable means, a locking plunger located a distance from the said rotatable means, means interposed between the said rotatable means and the said plunger whereby upon actuation of the said rotatable means the said plunger is actuated, coils, a holder for the said coils, means for securing the said coils within the said holder, and means whereby actuation of the said plunger operates to lock the said holder in position or to permit removal thereof.

3. Locking means for ignition systems, comprising, in combination, coils, a coil box, a holder for the coils adapted to be inserted into and removed from the said box with the coils therein, means for preventing the removal of the said coils from the holder while the latter is in the box, locking means for locking the said holder in the said box, and means for grounding the positive terminals of the said coils when the locking means is in locked position.

4. Locking means for the ignition system of an automobile, comprising, in combination, coils, a holder for said coils, a box within which the said holder is adapted to be mounted, the said holder having means whereby the said coils may not be removed when the holder is in the said box, means for locking the said holder against removal from the said box, and means for grounding the positive terminals of the said coils when the locking means is in locked position.

5. Locking means for the ignition system of an automobile, comprising, in combination, two sources of electrical current, coils, a box for the said coils, locking means for locking the said coils against removal from the said box, the said locking means comprising a rotatable element, a plunger, means interposed between the said rotatable element and the said plunger whereby upon rotation of the former actuation of the said plunger is effected to effect movement thereof into locking and unlocking positions, and means mounted upon the said rotatable element and actuated thereby for connecting either of the said sources of electric current in the circuits of the ignition system.

6. Locking and controlling means for the ignition system of an automobile, comprising, in combination, two sources of electric current, coils adapted to be included in circuit with either of said sources, locking means for locking the said coils in position, said locking means including a key actuated movable element and a plunger, and means interposed between the said element and the said plunger whereby upon actuation of the said element to cause movement thereof movement of the said plunger into and out of locking position is effected, and means carried by the said movable element which means is adapted to connect either of the said sources of electric current in circuit with the said coils.

7. Locking and controlling means for the ignition system of an automobile, comprising, in combination, two sources of electric current, coils which are adapted to be connected in circuit with either of said sources, a box for the said coils, means for locking the said coils within said box, said means including a key actuatable element and a plunger, and means interposed between said element and the said plunger whereby actuation of the said element causes movement of said plunger into and out of locking position, and means for grounding the positive terminals of the said coils when the said plunger is in locking position.

8. Locking and controlling means for the ignition system of an automobile, comprising, in combination, two sources of electric current, coils adapted to be connected in circuit with either of said sources, a box for the said coils, means for locking the said coils in place within said box to prevent removal thereof which includes a key actuated rotatable element, a locking device, and means interposed between the said element and the said locking device whereby rotation of the former operates to move the latter into and out of locking position, means operated upon actuation of the said element to connect either of the said sources of electric current in circuit with the said coils, and means tending to hold the said device in locked position.

9. Locking and controlling means for the ignition system of an automobile, comprising, in combination, coils, a supporting holder for the said coils, a box for the said holder, the said holder being provided with means whereby the said coils cannot be removed therefrom while it remains in the said box, locking means for locking the said holder in said box, said locking means including a key actuatable element and a locking plunger, and means interposed between the said key actuatable element and the said plunger whereby upon actuation of the said element the said plunger is moved into and out of locking position, and means for detachably connecting the said plunger and its holder to the said coil support.

10. Locking and controlling means for the ignition system of an automobile, comprising, in combination, coils, supporting means therefor, means for locking the said coils to the said supporting means, which locking means includes a key actuatable element and a plunger, and a connection between the said key actuatable element and the said plunger whereby upon actuation of the former the latter is moved into and out of locking position, yielding means tending to hold the said element in position with the said plunger in locking position, and means operating to hold the said element in one or more positions with the said plunger in unlocked position, the said last mentioned means becoming effective when the said element has been moved in one direction by a key.

11. Locking and controlling means for the ignition system of an automobile, comprising, in combination, two sources of electric current, coils with which each of said sources is adapted to be connected in circuit, a holder for the said coils, means for locking the said holder and the said coils in position which means includes a rotatable locking element and a plunger, and means interposed between the said element and the said plunger whereby rotation of the said element causes movement of said plunger into and out of locking position, yielding means tending to hold the said rotatable element in position to hold the said plunger in locking position, means carried by the said rotatable element for connecting either of the said sources of electric current in circuit with the said coils, and the said rotatable element carrying an arc-shaped member which is curved about its axis and is provided with a slot having a couple of notches in one edge thereof, a yieldably supported stop for engaging the said notches to hold the said rotatable element in either of two positions, the said stop being adapted to be moved inwardly to disengage the same from the said notches, and the said notches being so located that when one of them is engaged by the said stop one of the said sources of electric current is connected in circuit with said coils and when the other of said notches is engaged by the said stop the other of said sources is connected in circuit with the said coils.

12. Locking and controlling means for the ignition system of an automobile, comprising, in combination, two sources of electric current, coils, a support for the said coils, means for locking the said coils to the said support, which means includes a key actuatable rotatable element, a plunger, and means interposed between the said element and the said plunger whereby actuation of the former causes locking and unlocking movements of the said plunger, a casing within which the said element is located, binding posts mounted upon and projecting into the said casing, one of which binding posts is connected to the said coils while the other two are connected respectively to the said source of electric current, a contact member one end of which is at all times in contact with the first named binding post and the other end of which is adapted to contact with either one of the other of said binding posts upon rotation of the said rotatable element, an arcuate member carried by the said member and curved about the axis of said element, said member being provided with a slot having a couple of notches in one edge thereof, a releasing plunger extending into the said casing in parallel relation to the axis of the said rotatable element, the inner end of which releasing plunger is provided with a slot into which the said arcuate member projects, and the said plunger also having a pin extending cross wise of said slot and through the slot in the said arcuate member, and means tending to hold the said releasing plunger in its outermost position to cause the said pin to engage the notches in the slot of the said arcuate member to hold the latter in either of two positions with one end of the contact member carried by the said rotatable element in contact with one or the other of the second named binding posts.

13. An ignition system, comprising, in combination, coils, a holder for the said coils, said holder being provided with a base from which project upwardly two parallel spaced plates having upon the opposite sides of their upper edge portions horizontally extending projections, the said plates being so positioned as to permit the placing of a coil upon the base adjoining each end thereof outside of an adjoining plate, and the said plates being spaced a distance apart to permit the placing of one or more coils between the same, a box for the said holder and the coils thereon, and means for locking the said holder within the said box.

In testimony that I claim the foregoing as my invention I have hereunto signed my name this 24th day of February, A. D., 1927.

WILSON HEMINGWAY, Jr.